United States Patent
Pink et al.

(10) Patent No.: US 10,043,394 B2
(45) Date of Patent: Aug. 7, 2018

(54) SENSOR SYSTEM FOR RECOGNIZING PROTRUDING OR EXPOSED OBJECTS IN THE SURROUNDINGS OF A VEHICLE

(71) Applicant: Robert Bosch GmbH, Stuttgart (DE)

(72) Inventors: Oliver Pink, Stuttgart (DE); Axel Buettner, Stuttgart (DE); Dominik Maucher, Stuttgart (DE); Achim Feyerabend, Heilbronn (DE); Christoph Schroeder, Pleidelsheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 268 days.

(21) Appl. No.: 15/208,722

(22) Filed: Jul. 13, 2016

(65) Prior Publication Data

US 2017/0025019 A1    Jan. 26, 2017

(30) Foreign Application Priority Data

Jul. 21, 2015    (DE) .......................... 10 2015 213 694

(51) Int. Cl.
| | |
|---|---|
| *G01C 3/08* | (2006.01) |
| *G08G 1/16* | (2006.01) |
| *G01S 17/93* | (2006.01) |
| *G01S 17/87* | (2006.01) |
| *G01S 17/42* | (2006.01) |
| *G01S 13/93* | (2006.01) |

(52) U.S. Cl.
CPC .............. *G08G 1/167* (2013.01); *G01S 17/42* (2013.01); *G01S 17/87* (2013.01); *G01S 17/936* (2013.01); *G01S 2013/9375* (2013.01); *G01S 2013/9378* (2013.01); *G01S 2013/9385* (2013.01)

(58) Field of Classification Search
CPC .................. G08G 1/167; G01S 17/936; G01S 2013/9375; G01S 2013/9378; G01S 2013/9385
USPC ......................................................... 356/4.01
See application file for complete search history.

(56) References Cited

U.S. PATENT DOCUMENTS

| | | | | |
|---|---|---|---|---|
| 9,069,080 | B2 * | 6/2015 | Stettner ................. | G01S 17/023 |
| 9,778,364 | B2 * | 10/2017 | Gruver ................... | G01S 17/936 |
| 2006/0103927 | A1 * | 5/2006 | Samukawa ............. | G01S 17/42 |
| | | | | 359/436 |
| 2015/0131080 | A1 * | 5/2015 | Retterath ................ | G01S 17/10 |
| | | | | 356/5.01 |

* cited by examiner

*Primary Examiner* — Mark Hellner
(74) *Attorney, Agent, or Firm* — Norton Rose Fulbright US LLP; Gerard Messina (57) ABSTRACT

A sensor system for a vehicle for recognizing adjacent vehicles, situated in an adjacent lane, with protruding or exposed objects, is described which includes a first lateral LIDAR sensor. The first lateral LIDAR sensor is tilted about a first transverse axis with respect to the horizontal, so that the first detection range, with its front portion in the travel direction, detects a first upper spatial area laterally ahead of the vehicle, at a height above the installed position of the first lateral LIDAR sensor. The second lateral LIDAR sensor is tilted opposite to the tilt direction of the first LIDAR sensor about a second transverse axis with respect to the horizontal, so that the second detection range, with its rear portion in the travel direction, detects a second upper spatial area laterally behind the vehicle, at a height above the installed position of the second LIDAR sensor.

15 Claims, 7 Drawing Sheets

SENSOR SYSTEM FOR RECOGNIZING PROTRUDING OR EXPOSED OBJECTS IN THE SURROUNDINGS OF A VEHICLE

CROSS REFERENCE

The present application claims the benefit under 35 U.S.C. § 119 of German Patent Application No. DE 102015213694.9 filed on Jul. 21, 2015, which is expressly incorporated herein by reference in its entirety.

FIELD

The present invention relates to a sensor system for a vehicle for recognizing adjacent vehicles with protruding or exposed objects. Moreover, the present invention relates to a vehicle which includes such a sensor system, and a method for recognizing adjacent vehicles with protruding or exposed objects.

BACKGROUND INFORMATION

Recent vehicles use numerous sensors for detecting objects in the surroundings of the particular vehicle. The information obtained with the aid of the surroundings sensor system is used, among other things, for controlling a plurality of assistance systems. Depending on the characteristics, such assistance systems may merely assist the vehicle driver in driving the vehicle, or may also independently drive the vehicle. For systems driving in a partially and in particular highly automatic, i.e., autonomous, manner, a particularly reliable ascertainment of the vehicle surroundings is necessary. The surroundings information hereby obtained is then used as the basis for decisions which are sometimes very critical, such as whether a lane change may take place. To allow a particularly reliable ascertainment of this surroundings information, multiple sensors or sensor technologies, for example radar, LIDAR, video, or similar technologies are installed on the vehicle in such a way that a preferably full 360° panoramic view is achieved. When sensors are used, it must be noted that each of the sensor technologies used has its specific advantages and disadvantages. Thus, for example, the LIDAR sensors and radar sensors used in the vehicle as surroundings sensors typically have only a generally horizontal visual range. Due to the lack of a vertical visual range, such sensors are not able to satisfactorily, or adequately, recognize suspended, partially exposed superstructures in the immediate vicinity.

Due to the limited visual field of sensors and sensor systems presently available, there is a problem with reliably recognizing vehicles with protruding and exposed superstructures or loads, for example logging trucks or the like. This is true in particular for superstructures or loads which begin only at a height that is considerably above the typical installation height of these sensors. In principle, therefore, there is a risk that a space behind a truck with a protruding load may be recognized as presumably being safely traversable, although due to the protruding load, traversing this space would be assessed as not safely traversable.

SUMMARY

An object of the present invention, therefore, is to allow recognition of vehicles with protruding or exposed superstructures or loads without using additional sensors. This object may be achieved by an example sensor system, an example vehicle, and an example method according to the present invention. Advantageous specific embodiments are described below.

According to the present invention, a sensor system for a vehicle for recognizing adjacent vehicles, situated in an adjacent lane, with protruding or exposed objects is provided which includes a first lateral LIDAR sensor, situated on a first side of the vehicle, having a first detection range which covers first lateral surroundings of the vehicle, and a second lateral LIDAR sensor, situated on the first side of the vehicle, having a second detection range which covers second lateral surroundings of the vehicle. The sensor system also includes a control device for evaluating the signals of the two lateral LIDAR sensors. It is provided that the first lateral LIDAR sensor is tilted about a first transverse axis with respect to the horizontal, so that the first detection range, with its front portion in the travel direction, detects a first upper spatial area to the side and in front of the vehicle, above the installed position of the first lateral LIDAR sensor. In addition, it is provided that the second lateral LIDAR sensor is tilted opposite to the tilt direction of the first LIDAR sensor about a second transverse axis with respect to the horizontal, so that the second detection range, with its rear portion in the travel direction, detects a second upper spatial area to the side of and behind the vehicle, above the installed position of the second LIDAR sensor. Due to the tilted arrangement of the two lateral LIDAR sensors, the upper spatial areas to be monitored, which are situated in the adjacent lane at a predefined height in front of and behind the vehicle, are monitored without additional sensors. Since the lateral LIDAR sensors are typically tilted only slightly with respect to the horizontal, they are still capable of detecting objects next to the vehicle. Thus, monitoring the lateral vehicle surroundings is still possible with the aid of the lateral LIDAR sensors.

In one specific embodiment, it is provided that the first lateral LIDAR sensor is situated in a front vehicle section, while the second lateral LIDAR sensor is situated in a rear vehicle section. Due to this particular configuration, a relatively steep tilt angle of the two lateral LIDAR sensors results. This ensures that only objects situated in the immediate vicinity of the vehicle at a predefined height above the customary viewing height of the surroundings sensor system are detected. At the same time, with the particular configuration an overlap of the detection ranges of the two lateral LIDAR sensors is achieved at a relatively low height, so that objects directly next to the vehicle are particularly reliably recognized by the two lateral LIDAR sensors.

In another specific embodiment, the control device is designed for assessing an area directly ahead of or behind an adjacent vehicle situated in an adjacent lane, or an area between two sections of an adjacent vehicle situated in the adjacent lane, as traversable when neither of the two lateral LIDAR sensors recognizes an object. Due to the combined evaluation of the two specifically oriented LIDAR sensors, objects in the adjacent lane which are situated at the normal vehicle height as well as above the viewing height of customary sensor systems may be reliably recognized.

In another specific embodiment, the control device is designed for assessing an area directly behind an adjacent vehicle situated in an adjacent lane, or an area between two sections of an adjacent vehicle situated in the adjacent lane, as untraversable due to an obstacle which cannot be underridden when the first lateral LIDAR sensor recognizes an object while the second lateral LIDAR sensor at the same time does not recognize an object, or when the first lateral LIDAR sensor does not recognize an object while the second lateral LIDAR sensor at the same time recognizes an object, and/or when each of the two lateral LIDAR sensors recognizes an object. With the aid of these particular evaluation criteria, reliable recognition of vehicles in adjacent lanes with objects protruding or exposed to the rear, which begin only at a certain height above the viewing height of customary sensor systems, is made possible.

In another specific embodiment, it is provided that the control device is designed for assessing an area directly ahead of an adjacent vehicle situated in an adjacent lane, or an area between two sections of an adjacent vehicle situated in the adjacent lane, as untraversable due to an obstacle which cannot be underridden when the first lateral LIDAR sensor does not recognize an object while the second lateral LIDAR sensor at the same time recognizes an object, or when the first lateral LIDAR sensor recognizes an object while the second lateral LIDAR sensor at the same time does not recognize an object, and/or when each of the two lateral LIDAR sensors recognizes an object. With the aid of these particular evaluation criteria, reliable recognition of vehicles in adjacent lanes with objects protruding or exposed toward the front, which begin only at a certain height above the viewing height of customary sensor systems, is made possible.

In another specific embodiment, it is provided that a front sensor device for detecting the surroundings ahead of the vehicle is situated in such a way that it detects a third spatial area below the first spatial area covered by the first lateral LIDAR sensor. The control device is designed for assessing an area directly behind an adjacent vehicle situated in an adjacent lane, or an area between two sections of an adjacent vehicle situated in the adjacent lane, as untraversable due to an obstacle which cannot be underridden when the first lateral LIDAR sensor does not recognize an object while the front sensor device recognizes an object, or when the first lateral LIDAR sensor recognizes an object while the front sensor device does not recognize an object, and/or when the first lateral LIDAR sensor recognizes an object and the front sensor device at the same time likewise recognizes an object. With the aid of a front sensor device situated in this way, the spatial area below the first spatial area monitored by the first lateral LIDAR sensor may be detected, so that the reduction in vision in the lower lateral area due to the tilted arrangement of the lateral LIDAR sensors may be compensated for. Particularly reliable and robust recognition of objects in the lower and upper lateral spatial areas behind an adjacent vehicle may be achieved with the aid of the specific evaluation method.

In another specific embodiment, a rear sensor device for detecting the rear surroundings of the vehicle is situated in such a way that it detects a spatial area below the second upper spatial area covered by the second lateral LIDAR sensor. The control device is designed for assessing an area directly ahead of an adjacent vehicle situated in an adjacent lane, or an area between two sections of an adjacent vehicle situated in the adjacent lane, as untraversable due to an obstacle which cannot be underridden when the second lateral LIDAR sensor does not recognize an object while the rear sensor device recognizes an object, or when the second lateral sensor recognizes an object while the rear sensor device does not recognize an object, and/or when both the second lateral LIDAR sensor and the rear sensor device recognize an object. The use of a rear sensor device improves the monitoring of the spatial area below the second upper spatial area covered by the second lateral LIDAR sensor. Particularly reliable and robust recognition of objects ahead of an adjacent vehicle situated in an adjacent lane may be achieved with the aid of the rear sensor device and the specific evaluation method.

In another specific embodiment, it is provided that the additional sensor device is designed in the form of an additional LIDAR sensor. Additional front or rear LIDAR sensors form an optimal supplement to the lateral LIDAR sensors, whereby a 360° panoramic view having expanded lateral detection ranges ahead of and behind the vehicle, largely independent of external light conditions, may be created.

In another specific embodiment, it is provided that at least one front and/or rear radar sensor or video sensor is provided. Particularly robust detection of objects in the immediate surroundings ahead of and behind the vehicle is achieved with the aid of these sensor technologies used in addition to the LIDAR sensors.

In another specific embodiment, it is provided that a third lateral LIDAR sensor situated in a mirror image with respect to the first lateral LIDAR sensor, and a fourth lateral LIDAR sensor situated in a mirror image with respect to the second LIDAR sensor, are provided on a second side of the vehicle opposite from the first side. Due to the use of appropriate lateral LIDAR sensors on both sides of the vehicle, monitoring of the adjacent lanes to the left and right of the host vehicle lane is made possible. Overall, a great improvement in the 360° panoramic view is thus achieved.

The present invention is described in greater detail below with reference to the figures.

DETAILED DESCRIPTION OF EXAMPLE EMBODIMENTS

Previous sensors and sensor configurations, for example radar sensors, video sensors, and LIDAR sensors, allow detection of vehicles or objects in the adjacent lane which are situated between the roadway and approximately the mid-height of the host vehicle. However, due to the limited vertical opening angles of these sensors, it is not possible to reliably recognize obstacles in the adjacent lane which begin only above a certain height. These include, for example, protruding or exposed superstructures or loads such as large logs on logging trucks, etc. In addition, with the existing sensor systems it is not possible to make a distinction as to whether, for example, a logging truck is a single integral vehicle or two individual vehicles.

Figure 1:
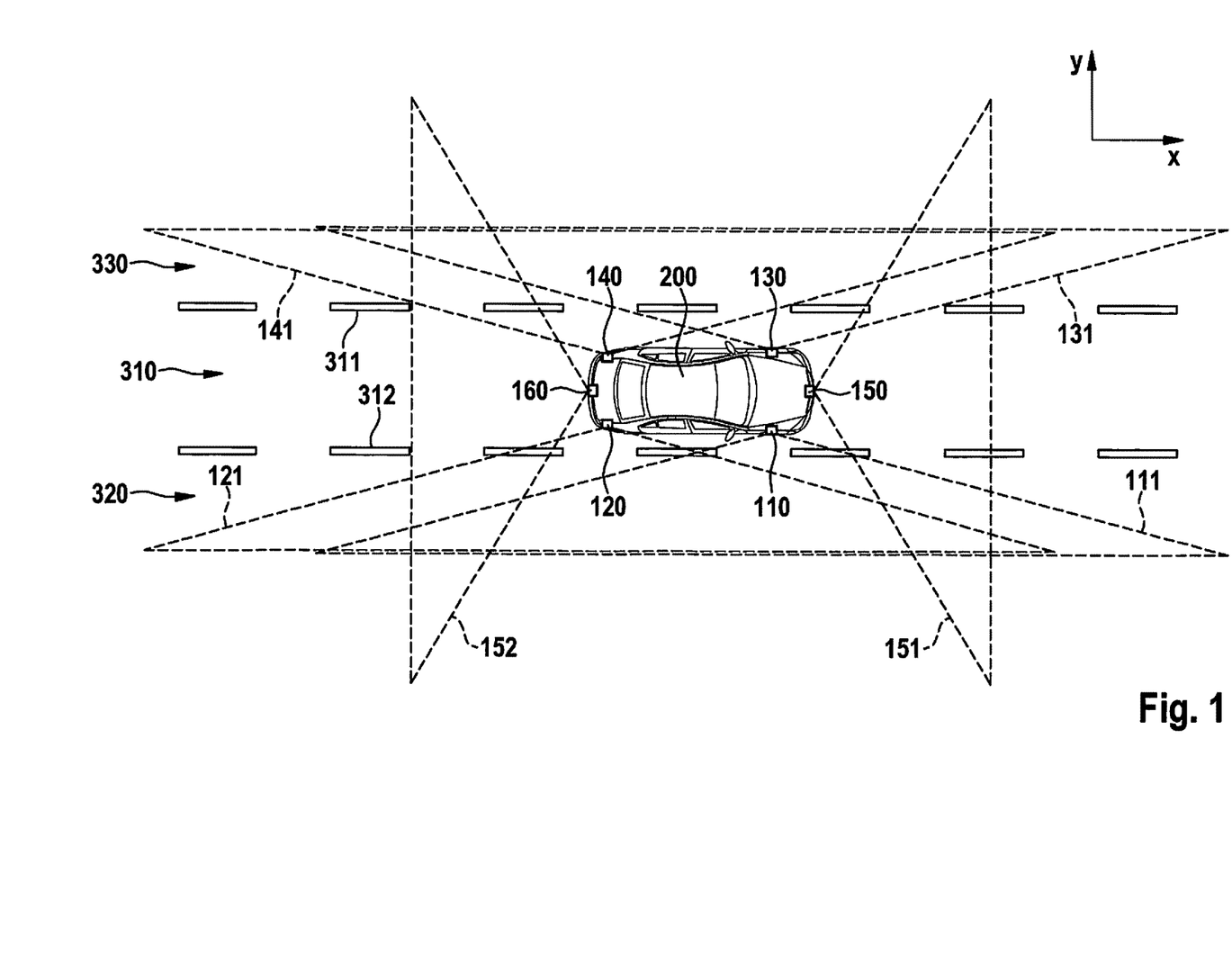
FIG. 1 shows a top view onto a vehicle with a 360° panoramic view achieved with the aid of LIDAR sensors.

In the present use of LIDAR sensors or laser scanners, which are typically installed on the side with a horizontal orientation, it is likewise not possible to recognize obstacles above a certain height due to the relatively low installation and the limited vertical opening angle (field of vision) of the particular sensors. To allow detection of obstacles which begin only above a certain height, an expanded vertical visual field is created by a modified configuration of two lateral LIDAR sensors. In this regard, FIG. 1 shows a top view onto a vehicle 200 which includes six LIDAR sensors situated on vehicle 200 and their detection ranges, which are illustrated by dashed lines.

A first lateral LIDAR sensor 110 installed in a front vehicle section 201, having a first lateral detection range 111, and a second lateral LIDAR sensor 120 installed in a rear vehicle section 202, having a second lateral detection range 121 which partially overlaps detection range 111 of first lateral LIDAR sensor 110, are situated on the right side of the vehicle. Similarly, a third lateral LIDAR sensor 130 situated symmetrically with respect to first lateral LIDAR sensor 110, and a fourth lateral LIDAR sensor 140 situated symmetrically with respect to second lateral LIDAR sensor 120, with their detection ranges 131, 141, respectively, which correspondingly cover the left side of the vehicle surroundings, are situated on the left side of the vehicle. In addition, a front LIDAR sensor 150 situated in a front vehicle area is provided, whose detection range 151 is directed forward in the travel direction. Similarly, a rear LIDAR sensor 160 having a detection range 161 which extends to the rear, opposite the travel direction, is provided in a rear vehicle area. In the present exemplary embodiment, vehicle 200 is situated on a multilane roadway, the left and right adjacent lanes 330, 320 being separated from lane 310 of vehicle 200 with the aid of lane markings 311, 312.

Figure 2:
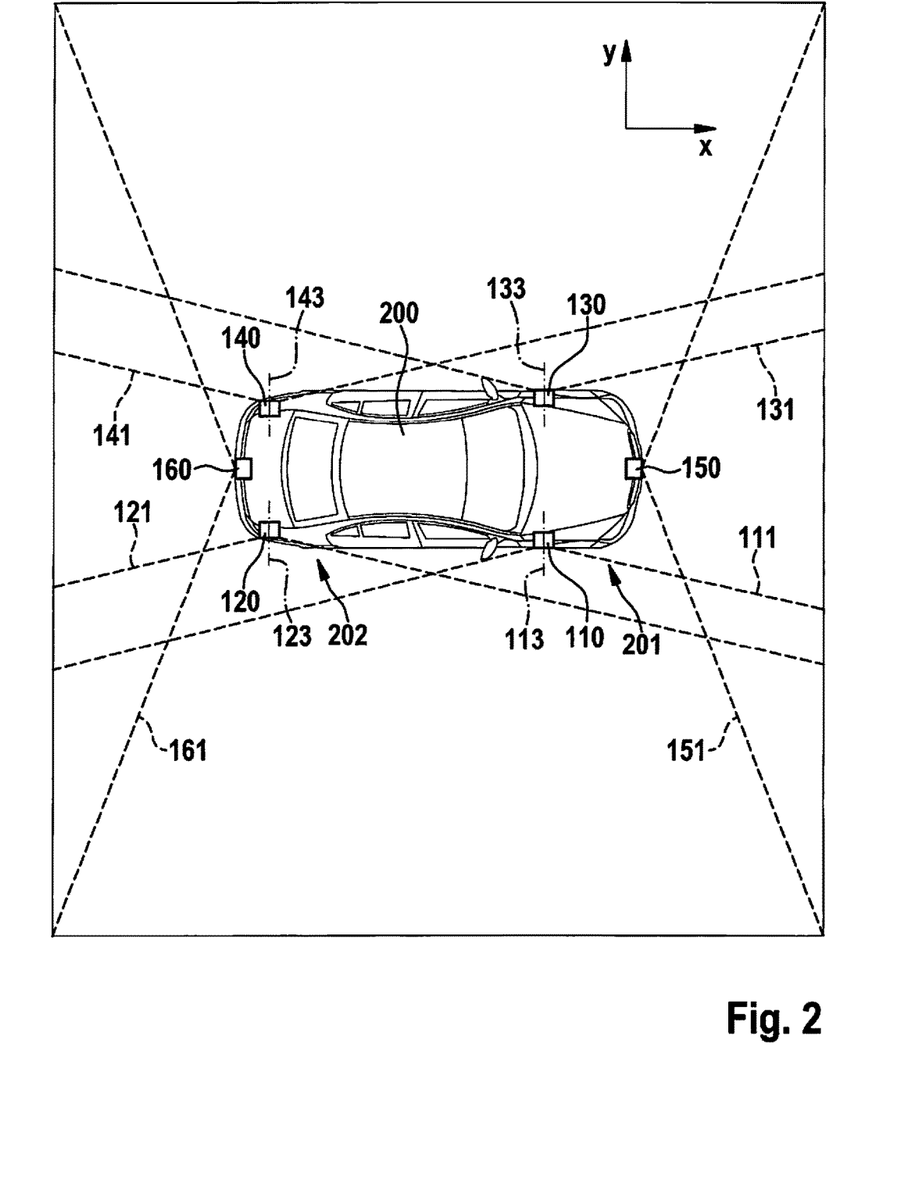
FIG. 2 shows a detailed illustration of the vehicle from FIG. 1 for explaining the configuration of the sensors.

To achieve the desired expansion of the visual field of the lateral LIDAR sensors in upper spatial areas of the two adjacent lanes 320, 330 situated ahead of and behind vehicle 200, the four lateral LIDAR sensors 110, 120, 130, 140 are each situated tilted in a certain manner about an individual rotation axis. In this regard, FIG. 2 shows a more detailed top view onto vehicle 200 from FIG. 1. Lateral LIDAR sensors 110, 120, 130, 140 together with their transverse axes 113, 123, 133, 143, respectively, which are each used as an individual rotation axis, are illustrated. Transverse axes 113, 123, 133, 143 preferably correspond to the main beam axes of the particular sensors. However, the transverse axes and the main beam axes may also differ from one another, depending on the design of the sensors. The rotation or tilting of lateral LIDAR sensors 110, 120, 130, 140 takes place in such a way that the front portion, in the travel direction, of detection range 111 of first LIDAR sensor 113 as well as the front portion, in the travel direction, of detection range 131 of third LIDAR sensor 130 are directed obliquely upwardly at a predefined angle α. Similarly, rear portion 122, in the travel direction, of detection range 121 of second LIDAR sensor 120 as well as rear portion 142, in the travel direction, of detection range 141 of fourth LIDAR sensor 140 are directed obliquely upwardly at a predefined angle β. The installed position and orientation of the lateral LIDAR sensors are selected in such a way that an optimal orientation toward the desired spatial area laterally ahead of and behind vehicle 200 results in each case. The main criterion for the arrangement of the lateral LIDAR sensors is that a certain criterion for the beam direction or the detection range, such as detection of floating objects up to a certain height ahead of the vehicle, is met by the rotation of the front and rear LIDAR sensors about their respective transverse axis.

Figure 3:
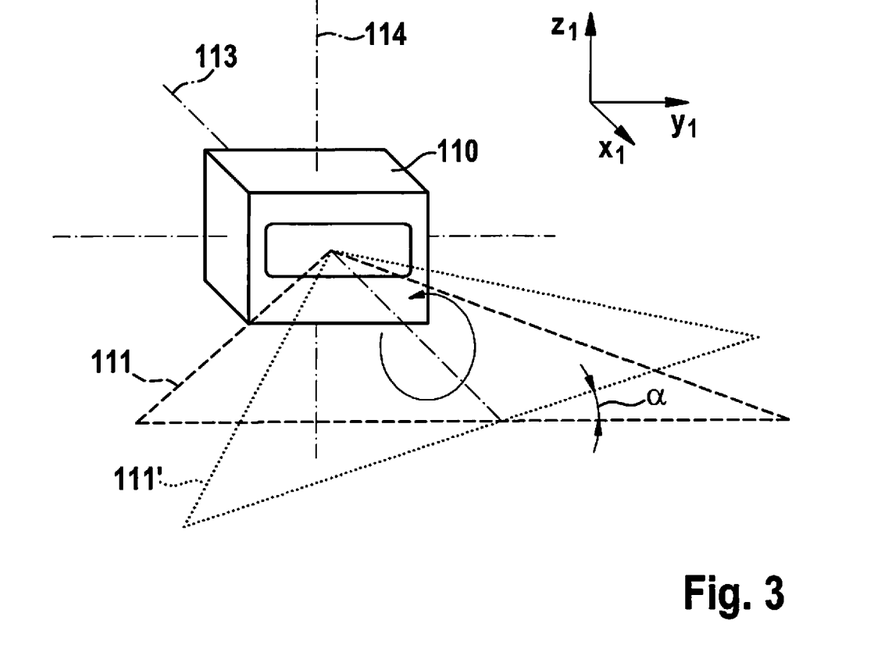
FIG. 3 schematically shows a lateral LIDAR sensor with a reference system for explaining the tilted arrangement of the sensor.

FIG. 3 schematically illustrates a lateral LIDAR sensor 110 together with its main axes for explaining the rotation of the LIDAR sensors. The rotation of the sensor preferably takes place in the sensor's own coordinate system, which is predefined by the main axes of sensor 110. The sensor has a generally perpendicular vertical axis 114 and a transverse axis 113, predefined by the main beam direction ($X_1$ direction), which may be oriented more or less strictly in parallel to a transverse axis of vehicle 200, as a function of the installed position. In the following exemplary embodiment, the rotation about transverse axis 113 takes place in the counterclockwise direction, so that detection range 111, which originally extends generally horizontally as illustrated by a dashed line in FIG. 3, extends in an oblique plane 111' after the rotation. Angle α corresponds to the tilt angle of sensor 110 in the installed state.

Figure 4:
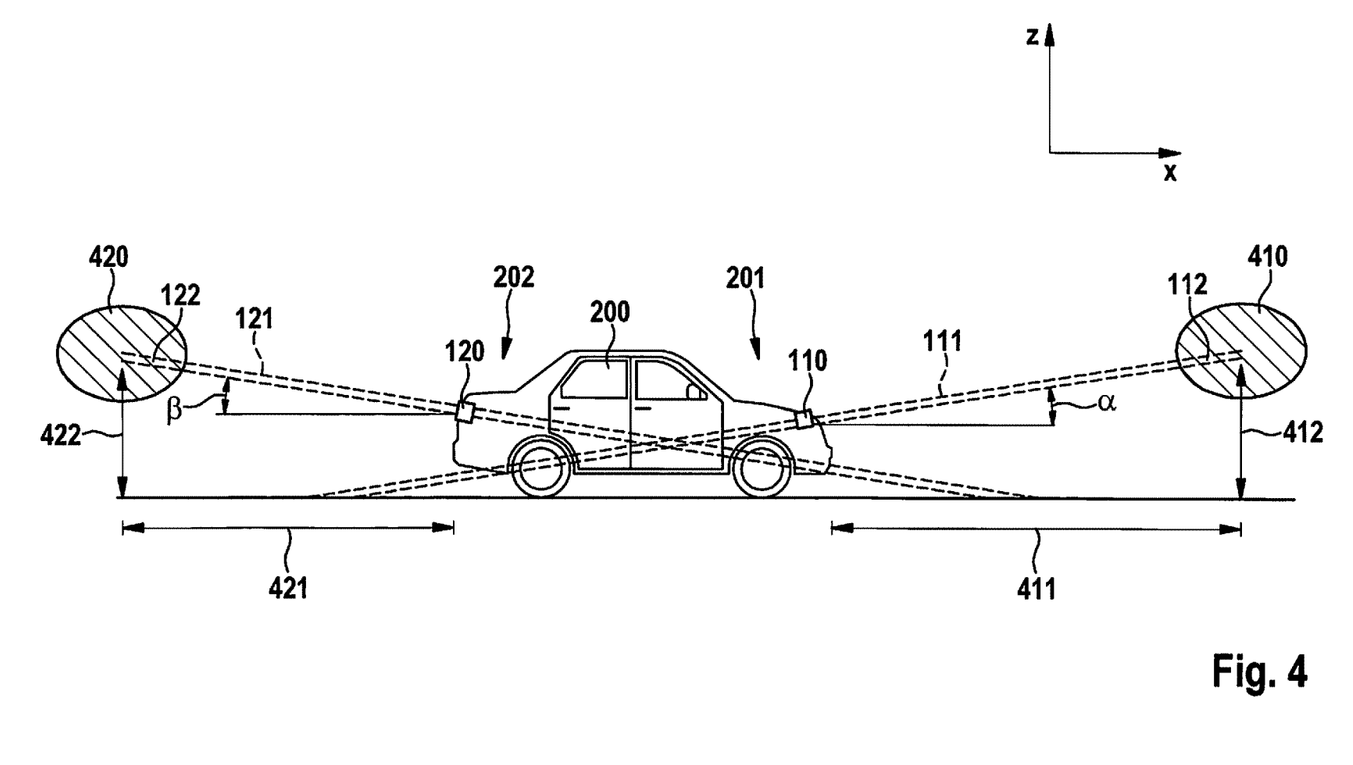
FIG. 4 shows a side view of the vehicle for explaining the detection ranges of the lateral LIDAR sensors.

FIG. 4 shows a side view of vehicle 200 together with lateral LIDAR sensors 110, 120 in a tilted orientation. It is apparent that front lateral LIDAR sensor 110 has been tilted by a predefined angle α from the horizontal by a counterclockwise rotation. As a result, a front portion 112, in the travel direction, of its detection range 111 detects a spatial area 410 situated ahead of vehicle 200 at a predefined distance 411 and a predefined height 412. Similarly, rear lateral LIDAR sensor 120 is tilted by a predefined angle β with respect to the horizontal by a clockwise rotation, so that a rear portion 122, in the travel direction, of its detection range 121 detects a second spatial area 420 situated at a predefined distance 421 and predefined height 422.

LIDAR sensors typically scan their surroundings in multiple superposed planes. The overall opening angle of the laser scanner perpendicular to the scanning direction, which is determined by the number of scanning planes and their angles relative to one another, may vary, depending on the application. A separate illustration of the individual scanning planes of the LIDAR sensors has been dispensed with in FIG. 4 and subsequent FIGS. 5 and 6 for reasons of clarity.

Figure 5:
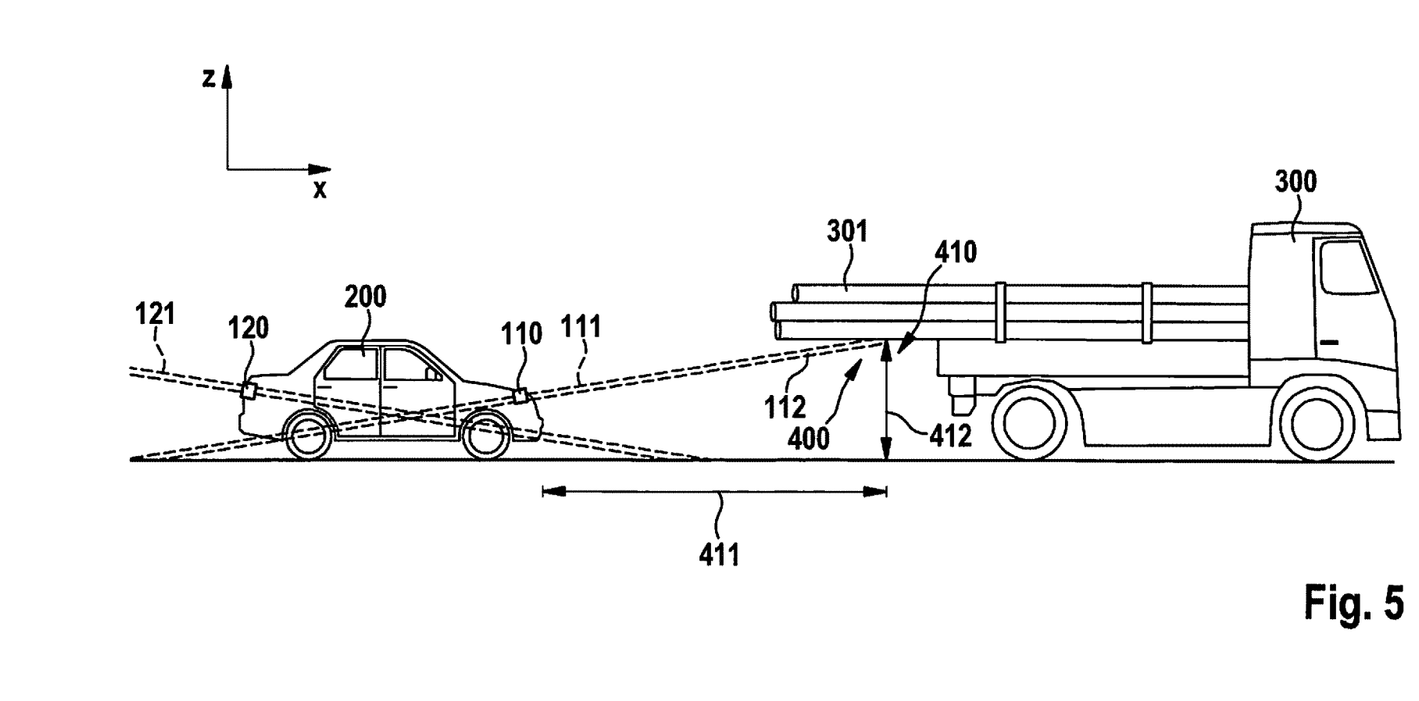
FIG. 5 shows a schematic illustration of the vehicle from FIG. 1 for explaining the detection of a protruding load on a truck traveling in an adjacent lane.

FIG. 5 shows, by way of example, a driving situation in which vehicle 200 is situated laterally behind an adjacent vehicle 300 with a load 301 prominently protruding from the rear. Adjacent vehicle 300 is situated on an adjacent lane 320 to the right of lane 310 of vehicle 200, so that detection ranges 111, 121 of lateral LIDAR sensors 110, 120 on the right side of vehicle 200 are oriented toward adjacent lane 320. It is apparent from FIG. 5 that first lateral LIDAR sensor 110, due to its tilted arrangement with a front portion 112, in the travel direction, of its detection range 111 detects protruding load 301 of adjacent vehicle 300 laterally in front of the first lateral LIDAR sensor at a height 412 and a distance 411. The tilted sensor system thus allows the detection of protruding or exposed superstructures or loads on adjacent vehicles as soon as they enter monitored spatial area 400 above the adjacent roadway.

Figure 6:
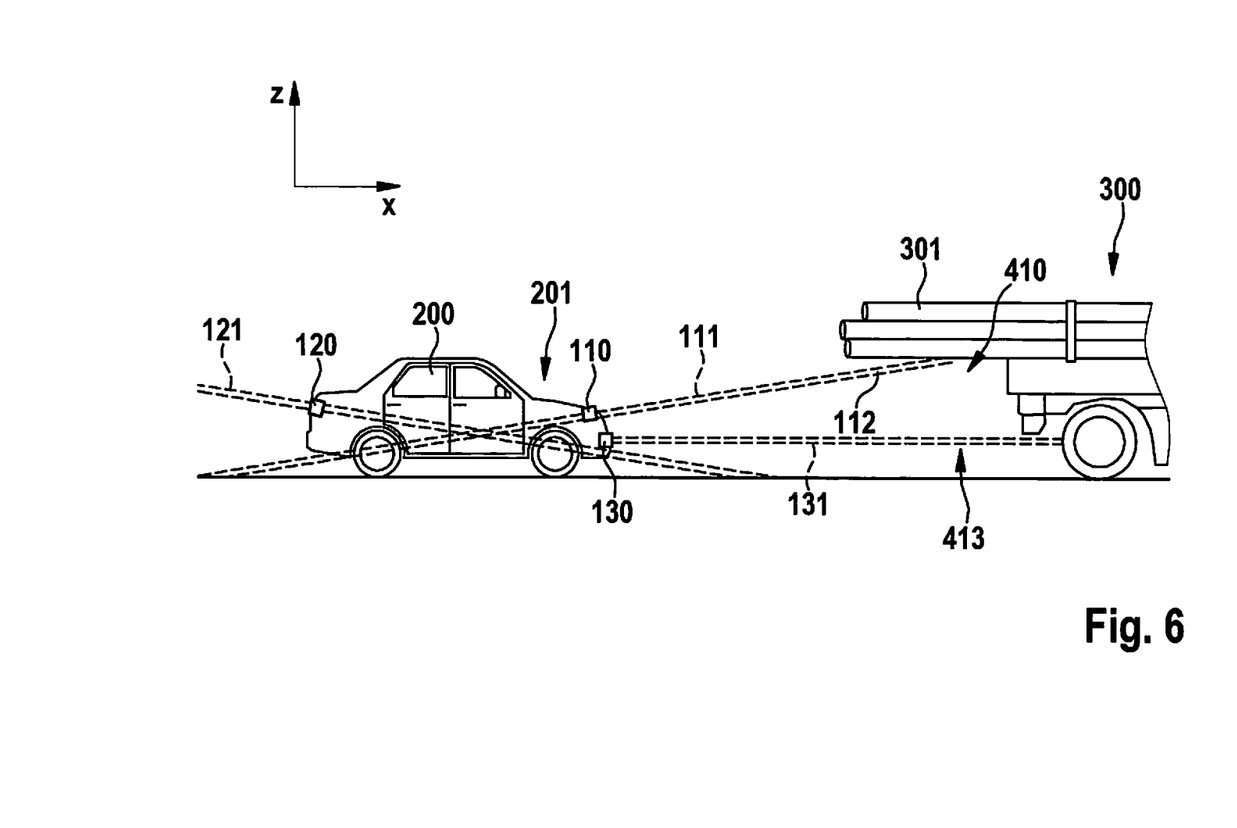
FIG. 6 shows a schematic illustration of a truck with a protruding load, with the aid of a lateral LIDAR sensor and a front LIDAR sensor.

To improve obstacle detection in adjacent lanes, further sensor devices directed forward and rearward may also be used in addition to lateral LIDAR sensors 110, 120, 130, 140. FIG. 6 shows vehicle 200 in a similar driving situation as illustrated in FIG. 5. Vehicle 200 additionally uses a front LIDAR sensor 130 directed forward. As is apparent from FIG. 6, generally horizontally extending detection range 131 of front LIDAR sensor 130 with its right portion also extends into a spatial area 413 below upper spatial area 410 detected by first lateral LIDAR sensor 110. Front LIDAR sensor 130 hereby also detects the rear portion of adjacent vehicle 300 situated below protruding load 301. By a joint evaluation of the signals of LIDAR sensors 110, 120 situated on the right side of the vehicle and of front LIDAR sensor 150, it is thus possible to provide clearly differentiated information concerning adjacent vehicle 300 and its rearwardly protruding load 301. In addition, with the aid of front LIDAR sensor 150 and an additional sensor directed forward, the detection results of the two lateral LIDAR sensors 110, 120 may be verified or checked for plausibility.

The evaluation of the sensor signals takes place with the aid of a sensor device, which likewise is an integral part of the sensor system according to the present invention. One example of the design of such a sensor system 100 is illustrated in a greatly simplified manner in FIG. 7. In the present exemplary embodiment, sensor system 100 situated in a vehicle 200 includes four lateral LIDAR sensors 110, 120, 130, 140, situated in pairs on one side of the vehicle, a front LIDAR sensor 150 situated in the front area of vehicle 200, and a rear LIDAR sensor 160 situated in the rear area of vehicle 200. The individual LIDAR sensors are connected to a single control device 170, which may take place via individual connecting lines or also via shared connecting lines, such as a data bus. Control device 170 may be designed as part of a higher-order control device. In addition, control device 170 may also include multiple individual control devices for controlling various sensors and other components.

Figure 7:
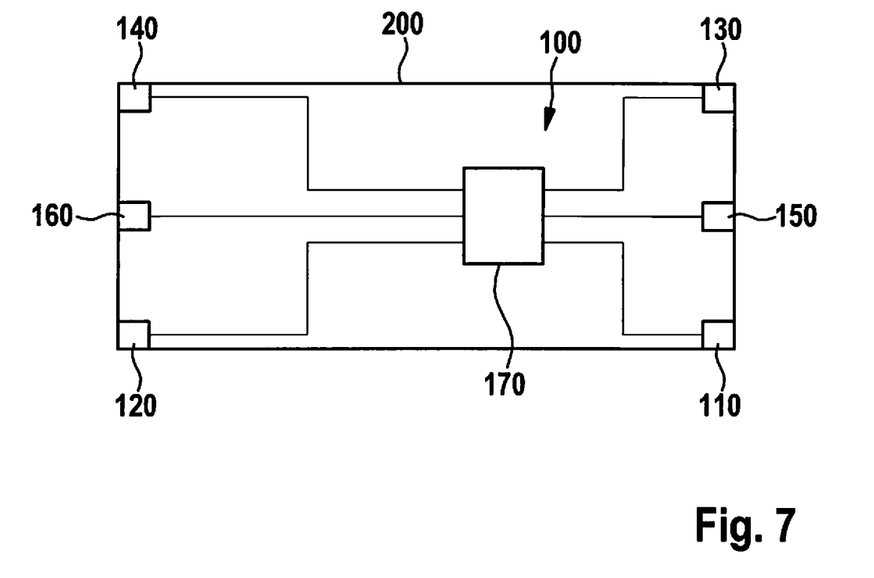
FIG. 7 shows a schematic illustration of the sensor system situated in a vehicle.

A suitable evaluation algorithm in the form of hardware and/or software is preferably implemented in control device 170 in order to detect protruding or exposed objects on vehicles situated in adjacent lanes. Multiple cases may be differentiated. Control device 170 is thus preferably designed for ruling out an obstruction by a protruding or exposed object in an adjacent lane 320, 330 when neither of the two pairs of lateral LIDAR sensors 110, 120 or 130, 140 which detect adjacent lane 320, 330, respectively, detects an object in the particular adjacent lane 320, 330. In this case, a lane change to the adjacent lane in question may take place. In addition, control device 170 is designed for assuming an obstruction by a protruding or exposed object in an adjacent lane 320, 330 when at least one of lateral LIDAR sensors 110, 120 or 139, 140 associated with the particular adjacent lane detects an object in the particular adjacent lane 320, 330. In these cases, for example during automated driving, no lane change would take place.

Control device 170 may also be designed for assuming an obstacle in an adjacent lane when an additional sensor, for example a LIDAR sensor, radar sensor, ultrasonic sensor, or the like, directed forward or rearward, recognizes an object in the particular adjacent lane.

In the event that the vehicle is driven automatically, control device 170 may prevent a lane change to an adjacent lane 320, 330 when the evaluation of the sensor signals indicates the presence of an obstacle in particular adjacent lane 320, 330.

The detection of the obstacles in the adjacent lanes may also be carried out without model-based computations. Rather, control device 170 may carry out the detection directly, using the raw data, the distances of the reflection being evaluated using geometric relationships in order to make the differentiation of the various cases without classifying entire objects.

Depending on the application, the control device may additionally use even further criteria, not mentioned here, for the final decision regarding whether an area directly ahead of or behind a vehicle traveling in an adjacent lane is traversable, or is not traversable due to an obstacle and therefore a lane change must not take place. Thus, the methodology for recognizing obstacles may in principle be expanded by one or multiple cases. Such an expansion is meaningful, for example, when objects have not been unequivocally recognized, and the detection therefore has a relatively high level of uncertainty.

In addition to the cases explained in greater detail in the preceding description, in which an object, such as a load or a protruding vehicle part, protrudes beyond the vehicle to the front or to the rear, the concept according to the present invention is also applicable in cases where a vehicle situated in the adjacent lane has exposed objects. This may be a so-called logging truck, for example. Such a vehicle typically includes multiple vehicle parts which are bridged by the load or other structures, which are not recognized as a single integral vehicle by conventional horizontally oriented sensors. Therefore, in principle there is a risk of erroneously recognizing the space or area between two vehicle parts as traversable, and end up under the load when a corresponding lane change is made. Due to the monitoring of the lateral upper spatial areas ahead of and behind the host vehicle, exposed objects which bridge two vehicle parts may likewise be reliably recognized. As a result, the space below a structure which bridges two vehicle parts is assessed as untraversable. Such a hazardous lane change may thus be prevented.

In addition to the cases described here, the evaluation algorithm in principle may also be expanded by further cases. For example, even more measuring data and information may enter into the decision regarding whether an obstacle which cannot be underridden is present in an adjacent lane, and a lane change should therefore not take place for safety reasons.

Although the present invention has been described above with reference to specific exemplary embodiments, it is in no way limited thereto. Those skilled in the art will therefore appropriately modify the described features and combine them with one another without departing from the core of the present invention.

What is claimed is:

1. A sensor system for a vehicle for recognizing adjacent vehicles situated in an adjacent lane with protruding or exposed objects, the system comprising:
   a first lateral LIDAR sensor situated on a first side of the vehicle, the first lateral LIDAR sensor having a first detection range which covers first lateral surroundings of the vehicle;
   a second lateral LIDAR sensor situated on the first side of the vehicle, the second lateral LIDAR sensor having a second detection range which covers second lateral surroundings of the vehicle; and
   a control device for evaluating signals of the first and second lateral LIDAR sensors, the first lateral LIDAR sensor being tilted about a first transverse axis with respect to the horizontal, so that the first detection range, with its front portion in a travel direction of the vehicle, detects a first upper spatial area laterally ahead of the vehicle, at a predefined height above an installed position of the first lateral LIDAR sensor, and the second lateral LIDAR sensor being tilted opposite to the tilt direction of the first LIDAR sensor about a second transverse axis with respect to the horizontal, so that the second detection range, with a rear portion in the travel direction, detects a second upper spatial area laterally behind the vehicle, at a predefined height above the installed position of the second LIDAR sensor.

2. The sensor system as recited in claim 1, wherein the first lateral LIDAR sensor is situated in a front vehicle section, while the second lateral LIDAR sensor is situated in a rear vehicle section.

3. The sensor system as recited in claim 1, wherein the control device is designed for assessing an area directly ahead of or behind an adjacent vehicle situated in an adjacent lane or an area between two sections of an adjacent vehicle situated in the adjacent lane, as traversable when neither the first lateral LIDAR sensor nor the second lateral LIDAR sensor recognizes an object.

4. The sensor system as recited in claim 1, wherein the control device is designed for assessing one of: i) an area directly ahead of or behind an adjacent vehicle situated in an adjacent lane, or ii) an area between two sections of an adjacent vehicle situated in the adjacent lane, as untraversable due to an obstacle which cannot be underridden at least one of:
   i) when the first lateral LIDAR sensor recognizes an object while the second lateral LIDAR sensor at the same time does not recognize an object,
   ii) when the first lateral LIDAR sensor does not recognize an object while the second lateral LIDAR sensor at the same time recognizes an object, and
   iii) when each of the first lateral LIDAR sensor and the second lateral LIDAR sensor recognizes an object.

5. The sensor system as recited in claim 1, further comprising:
   a front sensor device for detecting front surroundings of the vehicle, the front sensor device being situated in such a way that the front sensor device detects a spatial area below the first upper spatial area covered by the first lateral LIDAR sensor;
   wherein the control device is designed for assessing one of: i) an area directly behind an adjacent vehicle situated in an adjacent lane, or ii) an area between two sections of an adjacent vehicle situated in the adjacent lane, as untraversable due to an obstacle which cannot be underridden at least one of:
      i) when the first lateral LIDAR sensor does not recognize an object while the front sensor device recognizes an object,
      ii) when the first lateral LIDAR sensor recognizes an object while the front sensor device does not recognize an object, and
      iii) when the first lateral LIDAR sensor recognizes an object and the front sensor device at the same time recognizes an object.

6. The sensor system as recited in claim 1, further comprising:
   a rear sensor device for detecting rear surroundings of the vehicle, the rear sensor device being situated in such a way that it detects a spatial area below the second upper spatial area covered by the second lateral LIDAR sensor;
   wherein the control device is designed for assessing one of: i) an area directly ahead of an adjacent vehicle situated in an adjacent lane, or an area between two sections of an adjacent vehicle situated in the adjacent lane, as untraversable due to an obstacle which cannot be underridden at least one of:
      i) when the second lateral LIDAR sensor does not recognize an object while the rear sensor device recognizes an object,
      ii) when the second lateral LIDAR sensor recognizes an object while the rear sensor device does not recognize an object, and
      iii) when both the second lateral LIDAR sensor and the rear sensor device recognize an object.

7. The sensor system as recited in claim 6, wherein the rear sensor device is designed an additional LIDAR sensor.

8. The sensor system as recited in claim 5, wherein the front device is one of a video sensor or an ultrasonic sensor.

9. The sensor system as recited in claim 1, further comprising:
   a third lateral LIDAR sensor situated in a mirror image with respect to the first lateral LIDAR sensor; and
   a fourth lateral LIDAR sensor situated in a mirror image with respect to the second LIDAR sensor;
   wherein the third and fourth lateral LIDAR sensors are are provided on a second side of the vehicle opposite from the first side.

10. A vehicle which includes a sensor system for recognizing adjacent vehicles situated in an adjacent lane with protruding or exposed objects, the sensor system comprising:
   a first lateral LIDAR sensor situated on a first side of the vehicle, the first lateral LIDAR sensor having a first detection range which covers first lateral surroundings of the vehicle;
   a second lateral LIDAR sensor situated on the first side of the vehicle, the second lateral LIDAR sensor having a second detection range which covers second lateral surroundings of the vehicle; and
   a control device for evaluating signals of the first and second lateral LIDAR sensors, the first lateral LIDAR sensor being tilted about a first transverse axis with respect to the horizontal, so that the first detection range, with its front portion in a travel direction of the vehicle, detects a first upper spatial area laterally ahead of the vehicle, at a predefined height above an installed position of the first lateral LIDAR sensor, and the second lateral LIDAR sensor being tilted opposite to the tilt direction of the first LIDAR sensor about a second transverse axis with respect to the horizontal, so that the second detection range, with a rear portion in the travel direction, detects a second upper spatial area laterally behind the vehicle, at a predefined height above the installed position of the second LIDAR sensor.

11. A method for recognizing adjacent vehicles, situated in an adjacent lane, with protruding or exposed objects, the method comprising:
   scanning a first upper spatial area laterally ahead of the vehicle at a predefined height above an installed position of a first lateral LIDAR sensor with the aid of the first LIDAR sensor which is situated on one side of the vehicle, tilted about a first transverse axis with respect to the horizontal;
   scanning a second upper spatial area laterally behind the vehicle at a predefined height above an installed position of a second lateral LIDAR sensor with the aid of the second LIDAR sensor which is situated on the one side of the vehicle, tilted about a second transverse axis with respect to the horizontal; and
   assessing the traversability of one of: i) an area directly ahead of or behind the adjacent vehicle situated in the adjacent lane, or ii) an area between two sections of an adjacent vehicle situated in the adjacent lane, based on measuring data of the first and second lateral LIDAR sensors.

12. The method as recited in claim 11, wherein the one of: i) the area directly ahead of or behind an adjacent vehicle situated in the adjacent lane, or ii) the area between two sections of an adjacent vehicle situated in the adjacent lane, is assessed as traversable when neither the first lateral LIDAR sensor nor the second lateral LIDAR sensor recognizes an object.

13. The method as recited in claim 11, wherein the one of: i) the area directly ahead of or behind an adjacent vehicle situated in the adjacent lane, or ii) the area between two sections of an adjacent vehicle situated in the adjacent lane, is assessed as untraversable due to an obstacle which cannot be underridden at least one of:
   i) when the first lateral LIDAR sensor recognizes an object while the second lateral LIDAR sensor at the same time does not recognize an object,
   ii) when the first lateral LIDAR sensor does not recognize an object while the second lateral LIDAR sensor at the same time recognizes an object, and
   iii) when each of the first and second lateral LIDAR sensors recognizes an object.

14. The method as recited in claim one of claim 11, wherein a spatial area below the first upper spatial area covered by the first lateral LIDAR sensor is scanned with the aid of a front sensor device for detecting front surroundings of the vehicle, and one of: i) an area directly behind an adjacent vehicle situated in the adjacent lane, or an area between two sections of an adjacent vehicle situated in the adjacent lane, is assessed as untraversable due to an obstacle which cannot be underridden at least one of:
   i) when the first lateral LIDAR sensor does not recognize an object while the front sensor device recognizes an object,
   ii) when the first lateral LIDAR sensor recognizes an object while the front sensor device does not recognize an object, and
   iii) when the first lateral LIDAR sensor recognizes an object and the front sensor device at the same time recognizes an object.

15. The method as recited in claim 11, wherein a spatial area below the second upper spatial area covered by the second lateral LIDAR sensor is scanned with the aid of a rear sensor device for detecting the rear surroundings of the vehicle, and one of: i) an area directly behind an adjacent vehicle situated in the adjacent lane, or ii) an area between two sections of an adjacent vehicle situated in the adjacent lane, is assessed as untraversable due to an obstacle which cannot be underridden one of:
   i) when the first lateral LIDAR sensor does not recognize an object while the rear sensor device recognizes an object,
   ii) when the first lateral LIDAR sensor recognizes an object while the rear sensor device does not recognize an object, and
   iii) when the first lateral LIDAR sensor recognizes an object and the rear sensor device at the same time recognizes an object.

* * * * *